United States Patent Office 2,866,801
Patented Dec. 30, 1958

2,866,801

PROCESS FOR THE PRODUCTION OF ORGANIC ISOCYANATES

Chester M. Himel, Menlo Park, and Lawrence M. Richards, Long Beach, Calif., assignors to Ethyl Corporation, New York, N. Y., a corporation of Delaware No Drawing. Application December 27, 1955
Serial No. 555,297

7 Claims. (Cl. 260—453)

This invention is concerned with the production of organic isocyanates and in particular with the production of such compounds by the reaction of an organic halide with a metal cyanate, especially the alkali and alkaline earth metal cyanates.

The present commercial process for the preparation of organic isocyanates comprises the reaction of phosgene with amine salts. Attempts have been made in the past, with some success, to produce these isocyanates by the reaction of organic halogen compounds with inorganic cyanates such as those of silver and mercury. For example, silver cyanate reacted with isopropyl iodide produces isopropyl isocyanate, and 1,5-diiododipentamethylene reacted with silver cyanate results in pentamethylene diisocyanate. Similar such reactions are also known with certain other halogen compounds. The major drawback to the use of these particular inorganic cyanates is their high cost.

Accordingly, attempts have been made to replace the silver and mercury cyanates in these reactions and others with the alkali and alkaline earth metal cyanates. Such investigations have not been met with much success since these materials are less reactive and the products produced, in most instances, are not the isocyanates but the isocyanurates. Specifically, it is known that potassium cyanate will react with highly reactive organic halogen compounds, such as triphenylmethyl chloride, to produce the corresponding isocyanate. However, when attempts are made to produce the isocyanates of the less reactive allyl chloride, benzyl chloride, and similar alkyl, alkenyl, aralkyl, and aralkenyl halides, isocyanurates are obtained. For example, when allyl chloride is reacted with potassium cyanate in the presence of acetonitrile, the product obtained is triallyl isocyanurate, and only a minor amount of isocyanate is formed. As a result of our work in this field, we have discovered that the isocyanates can be prepared in higher yield and more efficiently by the reaction of the organic halides with the alkali and alkaline earth metal cyanates in the presence of specific solvents.

An object of this invention is, therefore, to provide a novel process for the production of organic isocyanates. Another object of this invention is to provide a process for the production of organic isocyanates by the reaction of an organic halide with alkali or alkaline earth metal cyanates in the presence of tertiary amides as a solvent. A further object of this invention is to prepare a mixture of organic isocyanates and isocyanurates having an enhanced isocyanate content by the reaction of organic halides with alkali or alkaline earth metal cyanates. A specific object of this invention is to prepare benzyl isocyanate by the reaction of benzyl chloride with sodium cyanate in the presence of dimethyl formamide. These and other objects will be apparent from the discussion hereinafter.

The above and other objects of this invention are accomplished by providing a process for the preparation of organic isocyanates which comprises reacting a metal cyanate selected from the group consisting of alkali and alkaline earth metal cyanates with an organic halide having at least one hydrogen atom on the halogen substituted carbon atom in the presence of tertiary amides. The organic halides selected from the group consisting of alkyl, alkenyl, aralkyl, and aralkenyl halides having at least one hydrogen atom on the halogen substituted carbon atom are particularly suitable in the process. Surprisingly, it has been found that the employment of the tertiary amides as solvents results in the formation of the isocyanates in higher yield than has been obtained heretofore when employing the alkali or alkaline earth metal cyanates. In some instances the direct product of the reaction is a mixture of the isocyanate and the isocyanurate. This mixture can be used as such, or the isocyanate can be separated from the isocyanurate by distillation or similar recovery techniques. In a preferred embodiment the reaction is conducted at a temperature between about 80 and 170° C. for a period of time between about 0.5 to 25 minutes at atmospheric pressure. In a particular embodiment benzyl chloride or p-xylylene dichloride is reacted with sodium cyanate in the presence of dimethyl formamide for a period of between about 0.5 and 10 minutes at atmospheric pressure at a temperature between about 100 to 170° C.

By the process of this invention the organic isocyanates are prepared in higher yield than heretofore obtainable when reacting the alkali or alkaline earth metal cyanates with the organic halides. Thus, these valuable products are prepared more economically in that these cheaper metal cyanates are employed. Further these isocyanates are prepared in comparatively short reaction times, resulting in greater throughput and savings in process economics.

The specific solvents which are employed in the process of this invention are the tertiary amides. By the term tertiary amide is intended an amide in which the sole nitrogen atom is bonded only to carbon atoms. These solvents can be represented by the following general structural formula

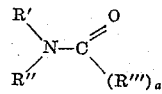

wherein R' is selected from the group consisting of monovalent aliphatic and aromatic radicals; R" is selected from the group consisting of monovalent aliphatic, aromatic, and divalent aliphatic radicals; R''' is selected from the group consisting of hydrogen, monovalent aliphatic radicals, and monovalent aromatic radicals; and when R" is a divalent aliphatic radical, one bond is attached to the nitrogen atom and the other to the carbonyl carbon, and the subscript "a" is zero. When R" is a monovalent radical, the subscript "a" is one. The terms monovalent aliphatic and monovalent aromatic radicals are intended to denote radicals from which a hydrogen atom has been removed to result in the free radical. By the term divalent aliphatic radical it is intended to denote a radical in which two hydrogen atoms have been removed, resulting in two free bonds, preferably separated by at least 4 carbon atoms but preferably not more than about 6 carbon atoms.

Thus, when the radicals are monovalent aliphatic radicals, they can be selected from the group consisting of monovalent alkyl, alkenyl, cycloalkyl, and cycloalkenyl radicals. Among the alkyl radicals which can be employed are included, for example, methyl, ethyl, propyl, isopropyl, and the like, up to and including those containing 18 carbon atoms and their corresponding branched chain isomers. Likewise, the monovalent alkenyl radicals include, for example, ethenyl, propenyl, butenyl, and the like, up to and including those containing 18 carbon atoms. Among the cycloalkyl radicals which can be employed are included cyclopropyl, cyclobutyl, cycloamyl, and the like, up to and including those containing about 18 carbon atoms. The cycloalkenyl radicals which can be employed include cyclobutenyl, cyclopentenyl, cyclohexenyl, and the like, up to and including those containing 18 carbon atoms. It is to be understood that both the cycloalkyl and cycloalkenyl radicals can be further substituted on the ring by, for example, alkyl groups. The monovalent aromatic radicals are intended to include those aromatic radicals in which one hydrogen atom has been removed, providing a free bond. These radicals can be mononuclear or polynuclear aromatic radicals. Typical examples of the mononuclear aromatic radicals include phenyl, ortho-, meta-, or para-methylphenyl, 2,4-dimethylphenyl, and the like phenyl radicals having one or more substituents, such as alkyl, alkenyl, cycloalkyl, and cycloalkenyl radicals bonded to the phenyl radical. Typical examples of polynuclear aromatic radicals include biphenylyl, $\beta$-anthryl, 2-methyl-$\alpha$-naphthyl, and the like. It is to be understood that alkaryl, aralkyl, and aralkenyl monovalent radicals can also be employed, as, for example, benzyl, $\alpha$-phenylethyl, $\alpha'$-naphthylmethyl, $\alpha$-phenyl-$\Delta^1$-propenyl, and the like radicals. When R'' is a divalent radical, it can be a polymethylene radical having from 4 to 18 carbon atoms. The preferred methylene radicals are those having 4 to 6 carbon atoms. In general, tertiary amides in which the radicals R', R'', and R''' have not more than 8 carbon atoms are most practical.

A criterion of choice of the solvent to be employed is that it be liquid under the reaction conditions. For best solvent characteristics it is preferred that it be liquid at room temperature and that the sum of the carbon atoms in the hydrocarbon radicals be between about 2 and 8 carbon atoms. It should likewise be essentially inert and non-reactive with either the organic halide or the metal cyanate. Thus, among the solvents which can be employed in the process of this invention are included, for example, dimethyl formamide, diethyl formamide, and the like, dimethyl acetamide, diethyl acetamide, methylethyl acetamide, methylphenyl formamide, ethylphenyl acetamide, and cycloamides such as N-methylcaprolactam, and the like. Primarily because of greater availability and improved solvent characteristics, dimethyl formamide is the preferred solvent.

Now turning to the organic halide reactant, in general, any organic halide can be employed which has at least one hydrogen atom on the halogen substituted carbon atom. Such definition includes compounds having a plurality of halogens provided the carbon atom on which the halogen is substituted has at least one hydrogen atom. Therefore organic halides of this description which can be employed include halo-ethers and thioethers such as di-(chloromethyl) ether of ethylene glycol, di-(chloromethyl) thio-ether of ethylene glycol and the like; nitriles such as $\beta$-chloropropionitrile, $\delta$-chloro-$\alpha$-chloro-butyronitrile; halo-substituted tertiary amines such as 4-chloro-N,N-diethyl butyl amine; nitro substituted hydrocarbon halides such as p-nitro benzyl chloride; and hydrocarbon halides. Other organic halides having functions other than the halides and which functions are essentially non-reactive with the metal cyanate will be evident. The organic hydrocarbon halides selected from the group consisting of alkyl (including cycloalkyl), alkenyl (including cycloalkenyl), aralkyl and aralkenyl halides or polyhalides having at least one hydrogen atom on the halogen substituted carbon atom are particularly preferred since the organic isocyanates produced therefrom are of greater stability and more useful in polymer preparation. Stated in another way, the preferred organic halide compounds employed are those compounds containing preferably only hydrogen, carbon, and halogen atoms and the halide function is primary or secondary, preferably the former. Typical but non-limiting examples of these preferred organic halides include benzyl chloride, xylylene dichloride, $\alpha^1$-$\alpha^5$-dichlorodurene, tetramethylene dichloride, n-butyl chloride, allyl chloride, amyl chloride, hexyl chloride, $\alpha$-cyclohexyl ethyl chloride, octenyl chloride, 1,4-dichloro-cyclohexane, and the like, and similar such compounds in which the halogen is bromine or iodine.

The metal cyanates which are employed include the alkali metal cyanates such as those of sodium, potassium, rubidium, and cesium; and the alkaline earth metal cyanates such as those of calcium, magnesium, strontium, and barium. Primarily because of greater availability, the alkali metal cyanates, especially sodium cyanate, are preferred.

The proportion of the reactants can be varied over a wide range. That is, both the reactants can be used in equimolar proportions, or either the metal cyanate or the organic halide can be in excess of between about 0.5 to 25 mole percent and higher. In general it is preferred that essentially stoichiometric amounts be employed.

The temperature at which the reaction is conducted is also varied over a wide range, as between 60 to 230° C. Reaction will occur at room temperatures; however, optimum temperatures have been found to be between 80 and 170° C., and therefore, this range is preferred. The pressure employed is generally atmospheric but can be as high as 5000 p. s. i. and higher.

The length of the reaction time is important. It has been found that short reaction periods produce higher yields of the isocyanate. In general, the reaction period can be between about 0.5 minute and 24 hours. For increased yield of the isocyanate the preferred reaction time is between about 0.5 minute and 25 minutes.

If desired, the reaction can be enhanced by incorporation of catalysts in the reaction mixture. Typical examples of such catalysts are the tertiary amines, such as triethylamine, and the quaternary ammonium halides, such as tetraethyl ammonium iodide. When employed, they are generally present in proportions between about 0.01 percent by weight up to about 5 percent by weight of the weight of the metal cyanate employed.

To demonstrate the process of the present invention the following examples are presented wherein all parts are by weight.

*Example I*

To a reactor equipped with an external heating and cooling means and a means for agitation was added 0.2 mole of benzyl chloride and 0.2 mole of sodium cyanate in 95 parts of dimethyl formamide. The mixture was mildly agitated and heated to a temperature of 145° C. It was maintained at this temperature for a period of 7 minutes and then immediately cooled to room temperature by external cooling. An aliquot portion of the reaction product thus obtained (1 ml.) was added to 10 ml. of standard amine solution prepared by dissolving 25 grs. of n-butyl amine in 1 liter of dry dioxane at room temperature. After standing for about 10 minutes this solution was back-titrated with 1 N-HCl. By this procedure it was determined that a 32 percent yield of benzyl isocyanate was obtained. The remaining reaction mixture was filtered and the filtrate added to 133 parts by weight of petroleum ether at 40–60° C. Upon cooling, tribenzyl isocyanurate crystals formed which were recovered in a yield of 38 percent.

*Example II*

This run was conducted essentially the same as above in Example I, with the exception that the solvent employed was 94 parts of dimethyl acetamide. The reaction temperature was 162° C., and the reaction time was 9.5 minutes. A 26 percent yield of benzyl isocyanate was obtained. The yield of isocyanurate was 70 percent.

*Example III*

Similar results are obtained when reacting 0.2 mole of allyl chloride with 0.2 mole of sodium cyanate in the presence of dimethyl formamide essentially as described in Example I.

*Example IV*

When reacting 0.2 mole of tetramethylene dichloride with 0.4 mole of sodium cyanate at a temperature of 150° C. in the presence of dimethyl formamide, tetramethylene diisocyanate is obtained in high yield employing a reaction time of 20 minutes.

*Example V*

Two-tenths mole of p-xylene dichloride reacted with 0.4 mole of sodium cyanate at a temperature between about 130 to 140° C. in the presence of dimethyl formamide for a period of 4 minutes results in a 20 percent yield of xylylene diisocyanate.

When calcium cyanate is substituted for sodium cyanate in any of the above examples, similar results are obtained. It is to be understood that the foregoing examples are cited merely as illustrations, and that other organic halides described previously can be substituted for those in the above examples in addition to the other alkali and alkaline earth metal cyanates. Likewise, the various other tertiary amides can be employed to produce similar results.

The above examples demonstrate the use of the tertiary amides as solvents, pointing out in particular the enhanced yield of isocyanates. In contrast to these results, the following examples demonstrate the use of a few of the prior art solvents in such a reaction and the results thereby obtained.

*Example VI*

Conducting the reaction essentially as described in Example I above, with the exception that the solvent employed was dioxane, the temperature was the reflux temperature, and the reaction time was 8 hours, no yield of isocyanate could be detected.

*Example VII*

Again conducting the reaction essentially as described in Example I, with the exception that the solvent was ethylene glycol dibutylether, the reaction time was 1 hour, and the reaction temperature was 150° C., no yield of isocyanate was detected.

*Example VIII*

Again conducting the reaction as described in Example I, but employing nitrobenzene as the solvent, the reaction temperature at 175° C., and the reaction time at 6 hours, no yield of isocyanate was detected.

*Example IX*

Reacting 0.035 mole of xylylene dichloride with 0.08 mole of sodium cyanate in the presence of 16 parts of acetonitrile for 5 minutes at the reflux temperature of the reaction mixture, no isocyanate was formed.

Thus, from the above results it can be seen that the employment of the tertiary amides as solvent in such a reaction unexpectedly results in higher yields of the isocyanates.

The reaction mixture can be employed as such. However, it is preferred to separate the organic isocyanate produced therefrom. One effective method for such separation is to add a minor amount of a polymerization inhibitor such as $PCl_3$, $P_2O_5$, CuCl, and the like inhibitors of isocyanate polymerization to the reaction mixture. The reaction mixture can then be fractionally distilled under vacuum to recover the isocyanate product. Alternatively, and preferably, after filtration of the reaction mixture the organic isocyanate is recovered by adding a liquid hydrocarbon medium such as hexanes, petroleum ether and the like, at a temperature between about 35 to 80° C. and usually in an essentially equal proportion by volume, with agitation. The mixture is then cooled and filtered to remove and, if desired, recover the by-products. Then a polymerization inhibitor, such as those mentioned above, is added to the filtrate and it is fractionally distilled under vacuum to recover the isocyanate product in pure form.

The products produced by the process of this invention are of considerable utility. For example, the isocyanates can be employed in condensation reactions with alcohols and amines to result in urethans and ureas; they can be employed as modifiers of polymers and adhesives and in many other uses. The diisocyanates which are prepared can be used in the preparation of resins which are foamed in place by interpolymerization or copolymerization in the presence of carbon dioxide. The isocyanurates can likewise be polymerized to form useful polymeric materials, or they can be heated with alkalis to produce primary amines. Other uses will be evident to those skilled in the art.

Having thus described the process of the present invention, it is not intended that it be limited except as specified in the following claims.

We claim:

1. A process for the preparation of organic isocyanates, which comprises reacting at a temperature below about 230° C. a metal cyanate selected from the group consisting of alkali and alkaline earth metal cyanates with an organic halide selected from group consisting of alkyl, alkenyl, aralkyl, and aralkenyl halides having at least one hydrogen atom on the halogen substituted carbon atom in the presence of a liquid and essentially inert tertiary amide in which the sole nitrogen atom is bonded only to carbon atoms as a solvent for a period between about 0.5 minutes to 24 hours.

2. The process of claim 1 in which said tertiary amide is an amide having the formula

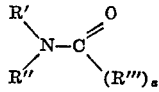

wherein R' is selected from the group consisting of monovalent aliphatic and aromatic radicals; R" is selected from the group consisting of monovalent aliphatic and aromatic radicals and divalent aliphatic radicals; R''' is selected from the group consisting of hydrogen, monovalent aliphatic radicals, and monovalent aromatic radicals; and when R" is a divalent aliphatic radical, one bond is attached to the nitrogen atom and the other to the carbonyl carbon, and the subscript "a" is zero; and when R" is a monovalent radical, the subscript "a" is one and wherein each of R', R", and R''' contain up to about 18 carbon atoms.

3. A process for the preparation of benzyl isocyanate, which comprises reacting benzyl chloride with sodium cyanate in substantially stoichiometric proportions at a temperature between about 80 to 170° C. for a period between about 0.5 and 25 minutes in the presence of dimethyl formamide as a solvent.

4. A process for the preparation of organic diisocyanates, which comprises reacting at a temperature up to about 230° C. a compound selected from the group consisting of alkyl, alkenyl, aralkyl, and aralkenyl dihalides having at least one hydrogen atom on the halogen substituted carbon atom with a metal cyanate selected from the group consisting of alkali and alkaline earth metal cyanates in the presence of a liquid and essentially inert tertiary amide in which the sole nitrogen atom is bonded only to carbon atoms as a solvent for a period between about 0.5 minutes to 24 hours.

5. The process of claim 4 wherein said dihalide is p-xylylene dichloride, said metal cyanate is sodium cyanate, and said tertiary amide is dimethylformamide.

6. The process of claim 4 wherein said metal cyanate is sodium cyanate and said tertiary amide is dimethylformamide.

7. The process of claim 6 wherein $\alpha^1$-$\alpha^5$-dichlorodurene is employed as the dihalide.

No references cited.